(12) United States Patent
Kato

(10) Patent No.: US 6,768,957 B2
(45) Date of Patent: Jul. 27, 2004

(54) ELECTRONIC AZIMUTH METER, CORRECTING MECHANISM FOR ELECTRONIC AZIMUTH METER, AND ELECTRONIC TIMEPIECE HAVING ELECTRONIC AZIMUTH METER

(75) Inventor: Kazuo Kato, Chiba (JP)

(73) Assignee: Seiko Instruments Inc., Chiba (JP)

( * ) Notice: Subject to any disclaimer, the term of this patent is extended or adjusted under 35 U.S.C. 154(b) by 370 days.

(21) Appl. No.: 09/837,840

(22) Filed: Apr. 18, 2001

(65) Prior Publication Data

US 2001/0042314 A1 Nov. 22, 2001

(51) Int. Cl.$^7$ .............................................. G06F 19/00
(52) U.S. Cl. ............................ 702/92; 73/1.76; 33/356
(58) Field of Search ............................ 702/92; 33/356, 33/355 R; 73/1.76

(56) References Cited

U.S. PATENT DOCUMENTS 5,090,231 A * 2/1992 Gallagher .................... 702/92
5,345,382 A    9/1994 Kao ........................ 364/424.01
5,644,851 A    7/1997 Blank et al. .................. 33/361

FOREIGN PATENT DOCUMENTS

| EP | 1120629  | 8/2001 |
|----|----------|--------|
| GB | 2130729  | 6/1984 |
| JP | 10170663 | 6/1998 |

* cited by examiner

Primary Examiner—John Barlow
Assistant Examiner—Stephen J. Cherry
(74) Attorney, Agent, or Firm—Adams & Wilks

(57) ABSTRACT

A correcting mechanism for an electronic azimuth meter has an X-direction magnetic sensor and a Y-direction magnetic sensor for detecting a magnetic field in two orthogonal directions X and Y and for calculating an azimuth of a main body of an electronic azimuth meter. An azimuth change inducing unit provides a display of an induction mark to induce a continuous change of the azimuth of the electronic azimuth meter main body over a range of rotation of at least 360 degrees.

18 Claims, 9 Drawing Sheets

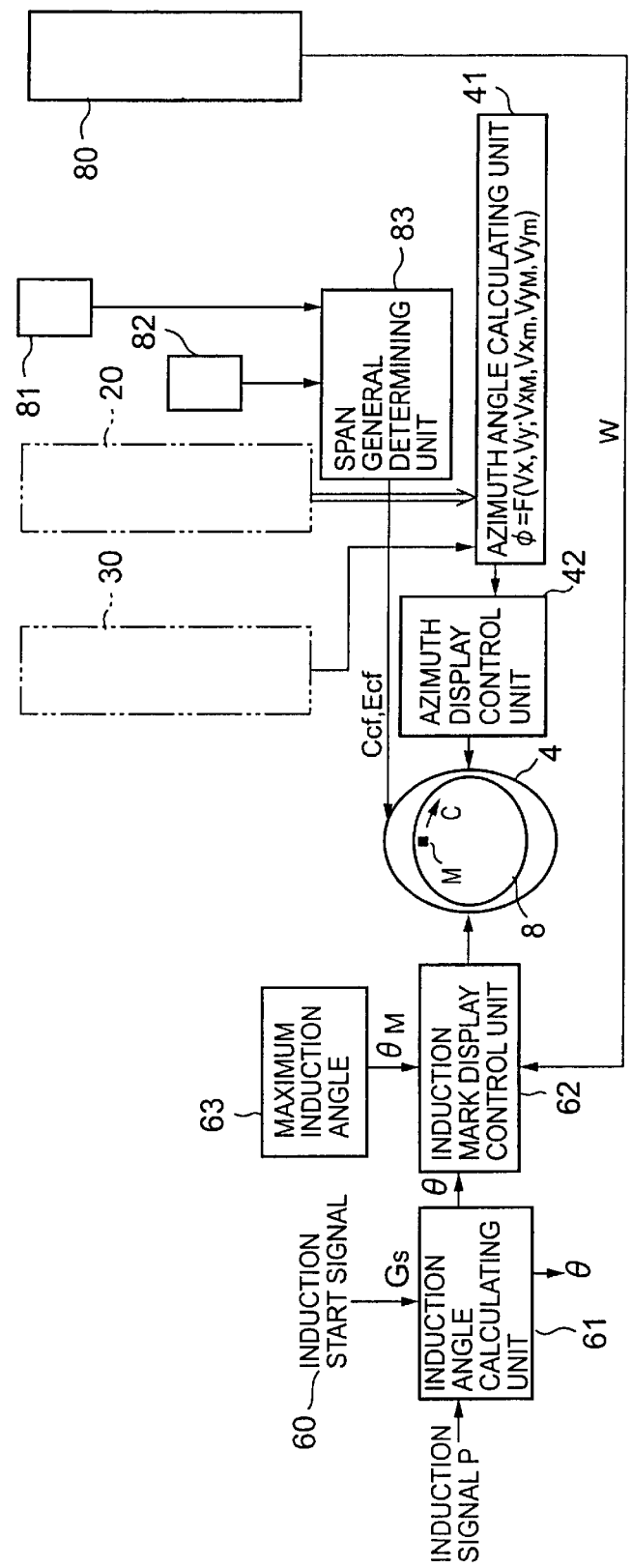

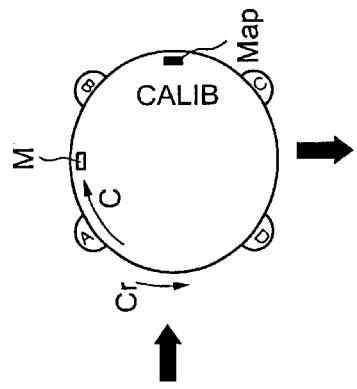
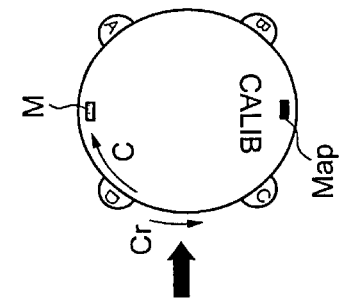
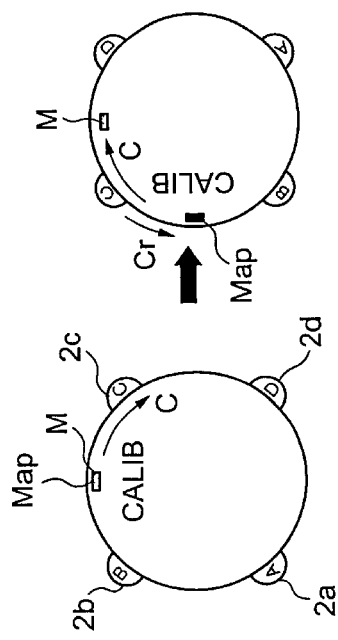
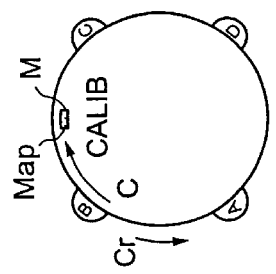
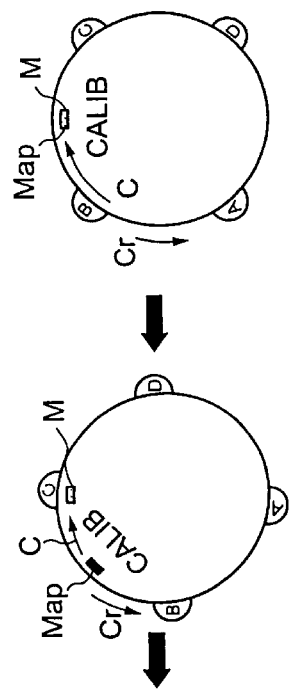
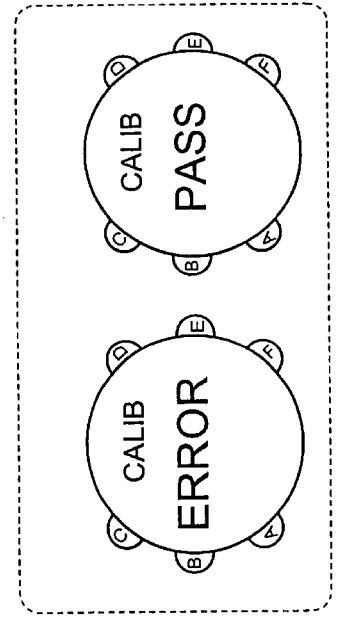

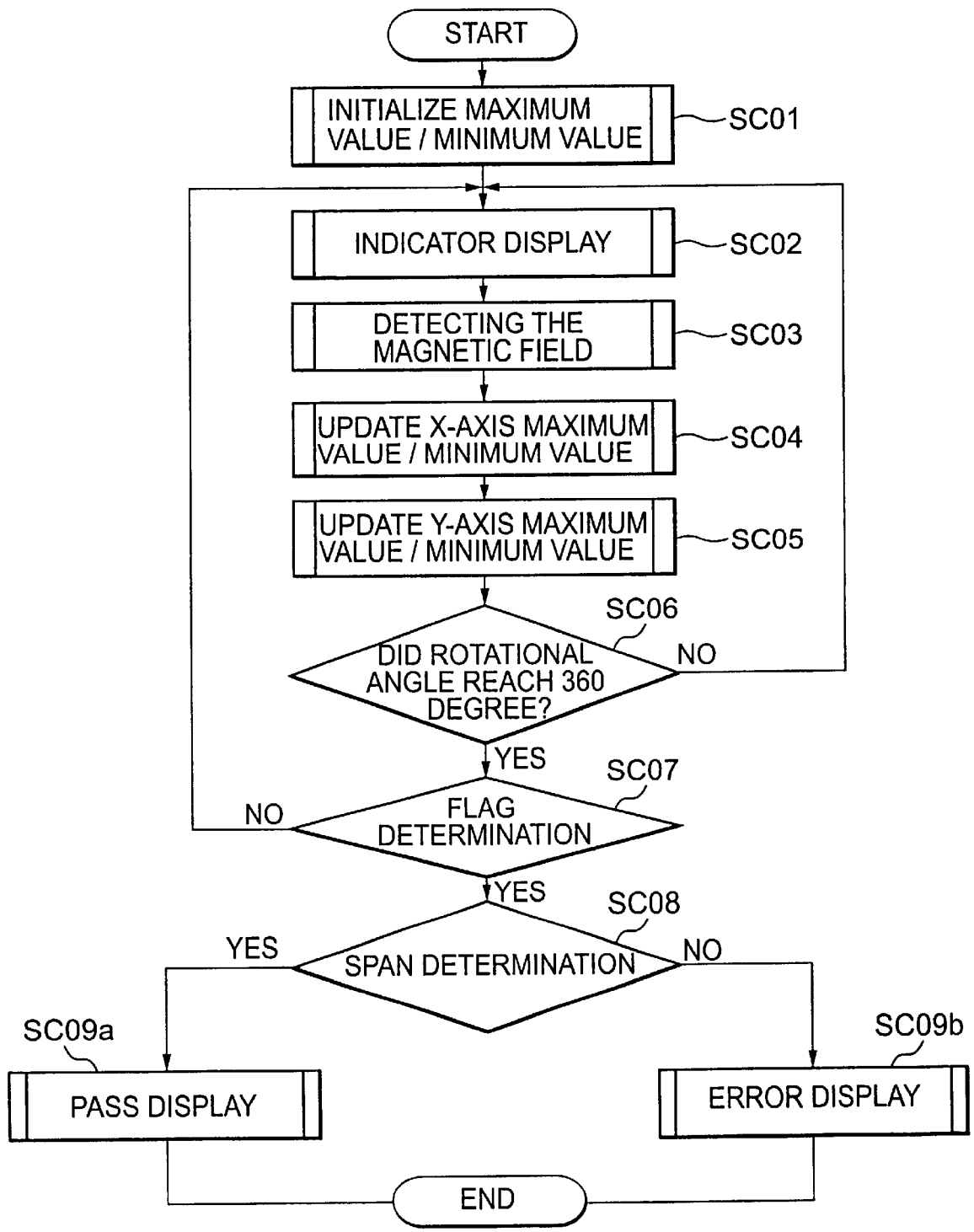

ELECTRONIC AZIMUTH METER, CORRECTING MECHANISM FOR ELECTRONIC AZIMUTH METER, AND ELECTRONIC TIMEPIECE HAVING ELECTRONIC AZIMUTH METER

BACKGROUND OF THE INVENTION

1. Field of the Invention

The present invention relates to an electronic azimuth meter and, more particularly, to the correction or calibration of the electronic azimuth meter and to an electronic timepiece having the electronic azimuth meter.

2. Description of the Prior Art

There is known an electronic azimuth meter having X-direction and Y-direction magnetic sensors comprising MR (magnetoresistive effect) elements for detecting intensity of a magnetic field with regard to respectives of two directions X and Y orthogonal to each other and calculating azimuth from the X-direction and Y-direction magnetic fields detected by the magnetic sensors. Further, it is also known that according to the electronic azimuth member, since a magnetic field by the geomagnetism is inherently small, when a portion of material constituting the azimuth meter is magnetized, a magnetic field produced by the magnetization is superposed on the magnetic field produced by the geomagnetism, a magnetic field sensed or detected by the magnetic sensors is deviated from the magnetic field produced by the geomagnetism and as a result, the azimuth is difficult to measure accurately.

Further, it is also known that in order to correct influence of remnant magnetization of a material of a constituent member of such an electronic azimuth meter, there are measured maximum values and minimum values of magnetic field detecting values by respectives of X-direction and Y-direction magnetic sensors when azimuth of the electronic azimuth meter is variously changed and the magnetic field detecting values are corrected based on the maximum values and the minimum values (for example, Japanese Patent Publication No. 30364/1987).

However, as described above, since the magnetic field produced by the geomagnetic on the earth (surface thereof) is inherently small (at a vicinity of Tokyo, the horizontal magnetic horizontal force is about 30 $\mu$T (strictly speaking, magnetic flux density), further, the dip is about 50 degree, the declination is about 6 degree to the west), detected output of the magnetic field is also small, there is a concern that a variation caused by noise is difficult to avoid and accordingly, accurate determination of the maximum values and the minimum values simply and in a short period of time, is not necessarily facilitated actually.

Further, since the magnetic sensors of the electronic azimuth meter detect magnitudes of components in predetermined directions of the magnetic field (magnetostatic field) or the magnetic flux density in the air, there is no actual benefit in discriminating between the magnetic field and the magnetic density in the air and, therefore, in the specification, the technical term of the magnetic field is used.

SUMMARY OF THE INVENTION

The present invention has been carried out in view of the above-described problem and it is an object thereof to provide a correcting mechanism of an electronic azimuth member facilitating to determine the maximum values and the minimum values, an electronic azimuth meter having the correcting mechanism and an electronic time piece having the electronic azimuth meter.

In order to achieve the above-described object, according to the invention, there is provided a correcting mechanism of an electronic azimuth meter having an X-direction magnetic sensor and a Y-direction magnetic sensor for detecting intensities of a magnetic field in two orthogonal directions X and Y and constituted to calculate an azimuth from magnetic field detecting values of the X- and the Y-direction magnetic sensors, comprising storing means for storing respectives of a maximum value and a minimum value with regard to the magnetic field detecting value by each of the X-direction and the Y-direction magnetic sensors, updating means for updating the maximum value or the minimum value to a newly detected magnetic field detecting value when the magnetic field value which is newly detected by each of the X-direction and the Y-direction magnetic sensors is larger than the maximum value stored in the storing means or smaller than the minimum value stored therein, azimuth change inducing means for providing a display of inducing a continuous change of the azimuth of an electronic azimuth meter main body over a range larger than 360 degree, predicting means for predicting that the maximum value or the minimum value in the X- or Y-direction is a true value when each of the maximum values and the minimum values of the magnetic field detecting values in the X-direction and the Y-direction is not updated during a predetermined time period in accordance with rotation of the electronic azimuth meter main body in accordance with an induction display of the azimuth change inducing means and canceling a prediction indicating the true value when the maximum value or the minimum value predicted to be the true value is updated by the updating means, and stop control means for stopping an updating processing by the updating means when all of the maximum values and the minimum values in the X-direction and the Y-direction are predicted to be the true values and induction by induction display of the azimuth change inducing means reaches 360 degree or more.

In the correcting mechanism of an electronic azimuth meter according to the invention, there are provided "the updating means for updating the maximum value or the minimum value to the newly detected magnetic field detecting value when the magnetic field detecting value which is newly detected by each of the X-direction and the Y-direction magnetic sensors is larger than the maximum value stored in the storing means or smaller than the minimum value stored therein, and predicting means for predicting that the maximum value or the minimum value in the X- or the Y-direction is the true value when updating is not carried out during a predetermined time period in accordance with rotation of the electronic azimuth meter main body in accordance with the induction display of the azimuth change inducing means with regard to respectives of the maximum values and the minimum values of the magnetic field detecting values in the X-direction and the Y-direction", and accordingly, with regard to respectives of the X-direction and the Y-direction, (except that an initial detecting value is adopted as the maximum value or the minimum value) so far as the magnetic field detecting values are provided in the forms of a maximum and a minimum, the magnetic field detecting values are adopted as the maximum value and the minimum value.

Further, according to the correcting mechanism of the invention, "the azimuth change inducing means is constituted to provide the display of inducing the continuous change of the azimuth of the electronic azimuth meter main body over the range of at least 360 degree", further, "the stop control means is constituted to stop the updating processing by the updating means when all of the maximum values and the minimum values in the X-direction and the Y-direction are predicted to be the true values and the induction by the induction display of the azimuth change inducing means reaches 360 degree or more" and accordingly, with regard to respectives of the X-direction and the Y-direction, the magnetic field detecting values provided as the maximum value and the minimum value are selected from detected values with regard to the azimuth of 360 degree, that is, all of the azimuth and therefore, the magnetic field detecting values can be the maximum value and the minimum value in two directions in principle.

Further, according to the correcting mechanism of the invention, "the continuous azimuth change induction display by the azimuth change inducing means is constituted to be able to carry out over a range larger than 360 degree" and "the update stop processing by the stop control means is constituted to carry out so far as all of the maximum values and the minimum values in the X-direction and the Y-direction are predicted to be the true values and the induction display by the azimuth change inducting means reaches 360 degree or more" and accordingly, even when jitter is caused by superposing noise on a magnetic field detecting output by noise, values proximate to the maximum value and the minimum value are firmly detected and the correction can be carried out.

That is, assuming that when there is started inducing operation for correction at a vicinity of an azimuth at which the magnetic field detecting value by the X-direction or the Y-direction magnetic sensor becomes just a maximum or a minimum, for example, at a location in which the magnetic sensor is rotated just by 360 degree and returns to a starting azimuth, at the location of the azimuth to be stopped, the magnetic field detecting value takes a value of upper or lower peak or proximate to the maximum or the minimum value. However, the magnetic field detecting value is changed in a sine curve with regard to the azimuth and accordingly, at the vicinity of the upper or the lower peak or the maximum or the minimum value, azimuth dependency of the magnetic field detecting value is inconsiderable and therefore, when noise is superposed, there is a concern of updating the maximum value or the minimum value immediately prior to the azimuth intended to stop. Further, the geomagnetism to be detected by the electronic azimuth meter is inherently weak and accordingly, the detecting output of the magnetic field of the geomagnetism is liable to undergo influence of noise and accordingly, there is a concern which is difficult to avoid in updating the maximum value or the minimum value by such a noise, as a result, there is a concern that the correcting operation cannot be finished properly.

In contrast thereto, in the case of the correcting mechanism of the invention, even when the maximum value or the minimum value is updated immediately prior to stop the sensor by being superposed with noise in a direction of increasing the peak at a location at which the sensor is rotated just about 360 degree and returns to the vicinity of the starting azimuth, the azimuth change inducing means induces azimuth change rotation of the electronic azimuth meter main body by exceeding 360 degree and is "constituted to carry out the update stop processing by the stop control means only when all of the maximum values and the minimum values in the X-direction and the Y-direction are predicted to be the true values" and accordingly, in the range exceeding 360 degree, until the updated maximum value or the minimum value is predicted to be the true value again, the correcting operation is continued, actually proper maximum value or minimum value is provided and there is hardly a concern of failing correcting operation. Further, the same goes with the case in which noise is superposed in a direction of reducing the peak at start of correcting operation.

In sum, the characteristic of the correcting mechanism of the electronic azimuth meter according to the present invention as described above resides in the correcting mechanism of the electronic azimuth meter having the X-direction magnetic sensor and the Y-direction magnetic sensor for detecting intensities of the magnetic field in the two orthogonal directions X and Y in which the azimuth change inducing means for inducing continuous change of the azimuth of the electronic azimuth meter main body is constituted to provide the induction display over a range larger than 360 degree.

The magnetic sensor may be provided with any constitutions so far as weak magnetic field such as the geomagnetism can be detected and the magnetic field detecting values in the two orthogonal directions X and Y can be provided.

The azimuth change inducing means typically comprises a rotating mark. However, other constitution may be used so far as the azimuth meter main body can be rotated by the user in accordance with induction by the azimuth change means. When the display unit is constituted by liquid crystal display, the mark is typically a conspicuous mark and the mark is, for example, winked. However, the mark may be conspicuous in view of color or shape. When the display unit of a mechanical mechanism, the mark may be, for example, a hand of a time piece.

When the correcting operation has been finished, the stop control means finishes the updating processing by the updating means. Thereby, the maximum detecting value and the minimum detecting value of the magnetic field in the X- and Y-directions stored to the storing means at the time point, are used as reference values of determining the azimuth by the electronic azimuth meter. As described above, when the maximum detecting value and the minimum detecting value in the X- and the Y-directions for constituting the reference values for determining the azimuth, are changed by putting in and out a constituent member of the electronic azimuth meter which is easy to carry remnant magnetization, for example, a button type battery or interchanging the battery to a new one, the maximum detecting value and the minimum detecting value in the X- and Y-directions may be corrected again by carrying out new correcting operation.

Further, when the correcting operation has been finished, the stop control means stops the updating processing by the updating means and so far as the maximum values and the minimum values in the X-direction and the Y-direction stored to the storing means are used in the measurement processing of the azimuth meter, when desired, detection of the magnetic field by the magnetic sensors, reading and detecting the detected magnetic field may be continued.

Further, the stop control means is preferably constituted to stop also the induction by the induction display of the azimuth change inducing means when the updating processing by the updating means is stopped. Thereby, consumption of battery energy can be minimized. However, induction (typically rotation) operation of the induction display of the inducing means may not be stopped and only display by display apparatus comprising the liquid crystal display apparatus may be switched from the azimuth meter correction mode to the correction display mode. Further, the stop control means may preferably be also constituted to make the azimuth change inducing means stop the induction by the induction display when the updating processing is stopped.

The electronic azimuth meter according to the invention is provided with the above-described correcting mechanism and an electronic time piece with an electronic azimuth meter according to the invention is provided with the electronic azimuth meter having the above-described correcting mechanism and is typically constituted to be switchable between the azimuth display mode and the time display mode.

BRIEF DESCRIPTION OF THE DRAWINGS

A preferred form of the present invention is illustrated in the accompanying drawings in which:

FIGS. 4A–4H show a manner of rotating an indicator (winking type induction mark) and a way of rotating an azimuth meter main body in carrying out a correcting operation by the electronic azimuth meter of FIG. 1, in which FIGS. 4A–4F are explanatory views showing respective stages of rotation, FIG. 4G is an explanatory view of display when the correcting operation is carried out normally and FIG. 4H is an explanatory view of display when the correcting operation is failed;

FIG. 5 is a flowchart showing an outline of the correcting operation of the electronic azimuth meter of FIG. 1.

DETAILED DESCRIPTION OF THE PREFERRED EMBODIMENTS

Next an explanation will be given of preferred embodiments of the present invention with reference to the drawings.

Figure 2:
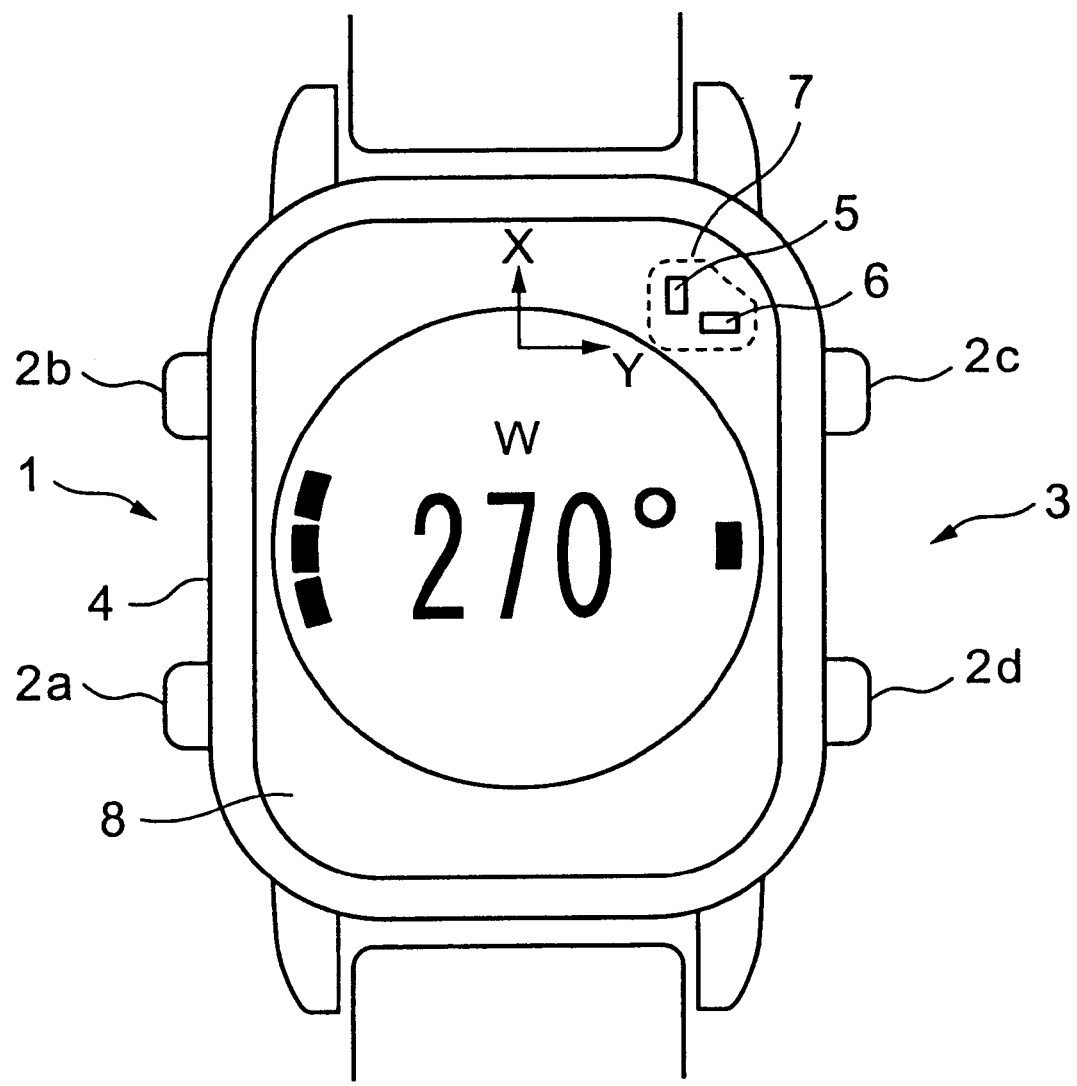
FIG. 2 is an explanatory view of a state in which an electronic azimuth meter with the electronic azimuth meter of FIG. 1 is in an azimuth mode.

An electronic time piece with an electronic azimuth meter 1 is in a shape similar to, for example, a wrist watch as shown by FIG. 2 and by depressing a push button switch 2a, a time display mode as a time piece and an azimuth display mode as an electronic azimuth meter 3 as illustrated, can be switched. Further, in the case of FIG. 2, it is displayed that azimuth angle $\phi$=270 degree and an upper azimuth on a face of FIG. 2 is west (W). Operation in the time display mode is the same as that of a well-known time piece and therefore, an explanation thereof will be omitted.

The electronic azimuth meter 3 is provided with a magnetic sensor unit 7 comprising an X-direction magnetic sensor 5 and a Y-direction magnetic sensor 6 for sensing or detecting magnetic field (magnetic flux density) in orthogonal two X- and Y-directions in an electronic azimuth meter main body 4 comprising a case or the like of the azimuth meter. Typically, each of the magnetic sensors 5 and 6 is constructed by a constitution comprising a bridge circuit including two or four magnetoresistive elements (MR elements) and taking out a differential output of the bridge circuit. The magnetic sensors 5 and 6 may be any other sensors such as flux gate sensors or Hall element sensors in place of the MR elements so far as the magnetic field (or magnetic flux density) having a magnitude of about the geomagnetism can be detected directly or indirectly. Here, X-Y coordinate system is a coordinate system fixed to the electronic azimuth meter main body 4. Further, numeral 8 designates a display unit comprising, for example, liquid crystal display elements.

Figure 3:
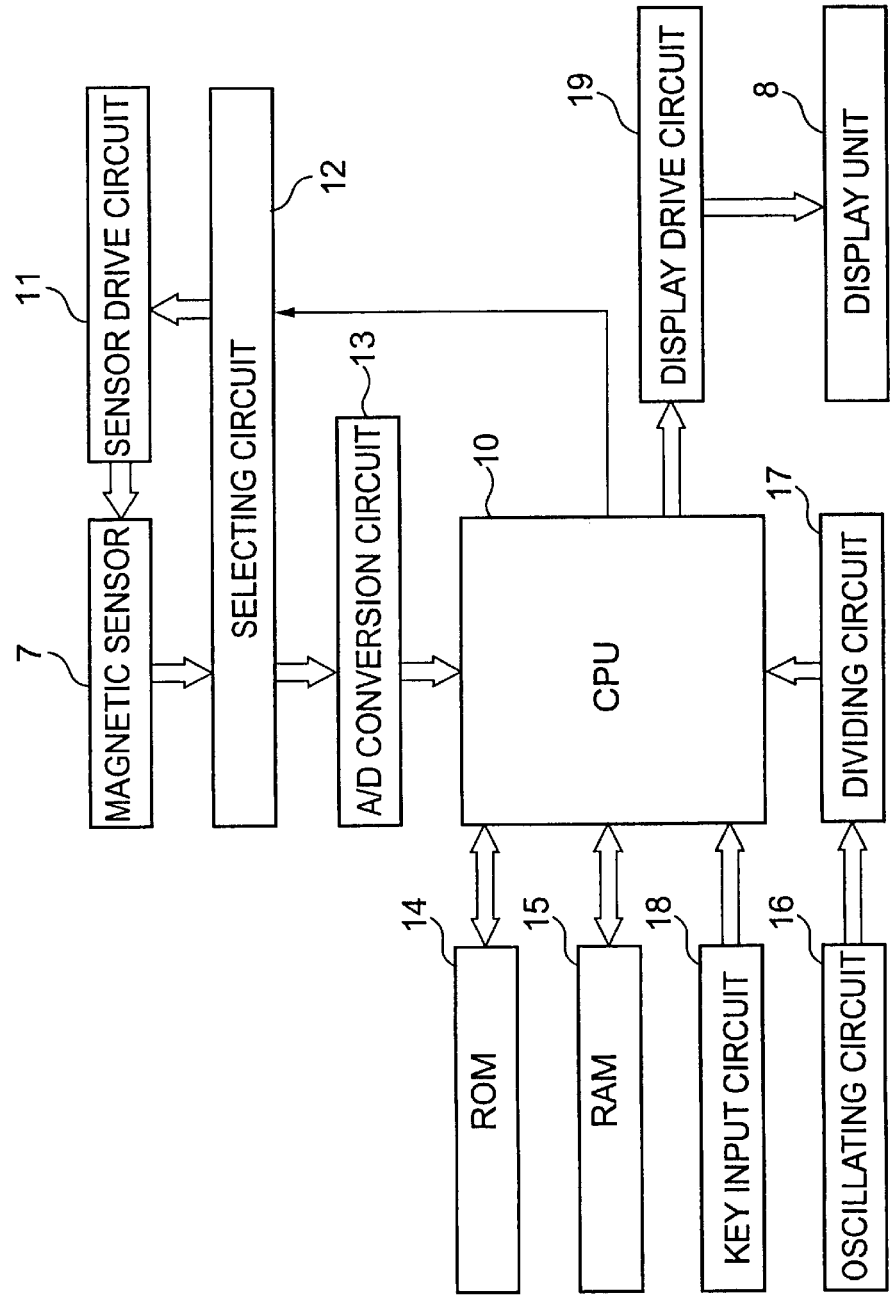
FIG. 3 is an explanatory block diagram of an electronic time piece having the electronic azimuth meter of FIG. 2.

According to the electronic azimuth meter 3, in view of a hardware thereof, as shown by FIG. 3, in addition to CPU (operation control unit) 10 such as a microprocessor, there are provided a sensor drive circuit 11 for driving the magnetic sensor 7, a selecting circuit 12 for controlling a timing of driving the sensor 7 by the sensor drive circuit 11 and a timing of reading magnetic field detecting outputs Vx and Vy of the sensor 7 and an A/D conversion circuit 13 for converting the magnetic field detecting outputs (voltage) Vx and Vy of the sensor 7 into digital signals around CPU 10 as sensor-related input/output circuits, further, there are provided ROM 14 and RAM 15 as storing units related to CPU 10. ROM 14 is stored with programs and the like for carrying out azimuth meter operation, mentioned later. ROM 14 typically includes PROM portion such as EEPROM and the portion is rewritably stored with maximum values $Vx_M$ and $Vy_M$ and minimum values $Vx_m$ and $Vy_m$ of magnetic fields in X- and Y-direction, mentioned later. Further, an oscillating circuit 16 for providing basic clock and a dividing circuit 17 thereof generate drive timing pulses by CPU, a key input circuit 18 provides depress signals of push button switches 2a, 2b, 2c and 2d to CPU 10 as key inputs and a display drive circuit 19 drives the display unit 8 for displaying display output of CPU.

When only the horizontal magnetic force of the geomagnetism is exerted to the X-direction magnetic sensor 5 of the electronic azimuth meter 3, the magnetic field detecting output Vx of the X-direction magnetic sensor 5 becomes the maximum value $Vx_M$ when X-direction of the magnetic sensor 5 is made to coincide with the direction of the horizontal magnetic force and becomes the minimum value $Vx_m$ when X direction is directed in a direction right reverse thereto and a sine curve is drawn therebetween. Also with regard to the magnetic field detecting output of the Y-direction magnetic sensor 6, there is similarly constituted a sine curve between the maximum value $Vy_M$ and the minimum value $Vy_m$ similarly except a difference in phase. Therefore, when sensitivities of the two sensors 5 and 6 are the same and there is not provided a ferromagnetic part influencing the two sensors 5 and 6 differently, in view of Vx-Vy orthogonal coordinates, (Vx, Vy) constitutes a circle centering on the original point and becomes an ellipse centering on the original point when sensitivities and the like of the two sensors 5 and 6 differ from each other. In any case, when Vx, Vy, $Vx_M$, $Vx_m$, $Vy_M$ and $Vy_m$ are determined, as azimuth angle $\phi$ is $\phi$=F (Vx, Vy, $Vx_M$, $Vx_m$, $Vy_M$ and $Vy_m$). According to the example, $Vx_M$+$Vx_m$=0, $Vy_M$+$Vy_m$=0.

Further, when there is provided remnant magnetization having a constant magnitude at a portion of the electronic azimuth meter 3 other than the sensor 5 or the sensor 6 per se, the X-direction and Y-direction magnetic sensors 5 and 6 are applied with constant remnant magnetic field which is not dependent upon the azimuth of the azimuth meter 3 in addition to the azimuth components of the horizontal magnetic force which is dependent upon the azimuth of the azimuth meter 3 and therefore, (Vx, Vy) become a circle or an ellipse the center of which is moved in accordance with the remnant magnetic field vector. In any case, when Vx, Vy, $Vx_M$, $Vx_m$, $Vy_M$ and $Vy_m$ are determined, as azimuth angle $\phi$ is $\phi$=F (Vx, Vy, $Vx_M$, $Vx_m$, $Vy_M$ and $Vy_m$). In this example, the center is (($Vx_M$+$Vx_m$)/2, ($Vy_M$+$Vy_m$)/2)).

Figure 1A:
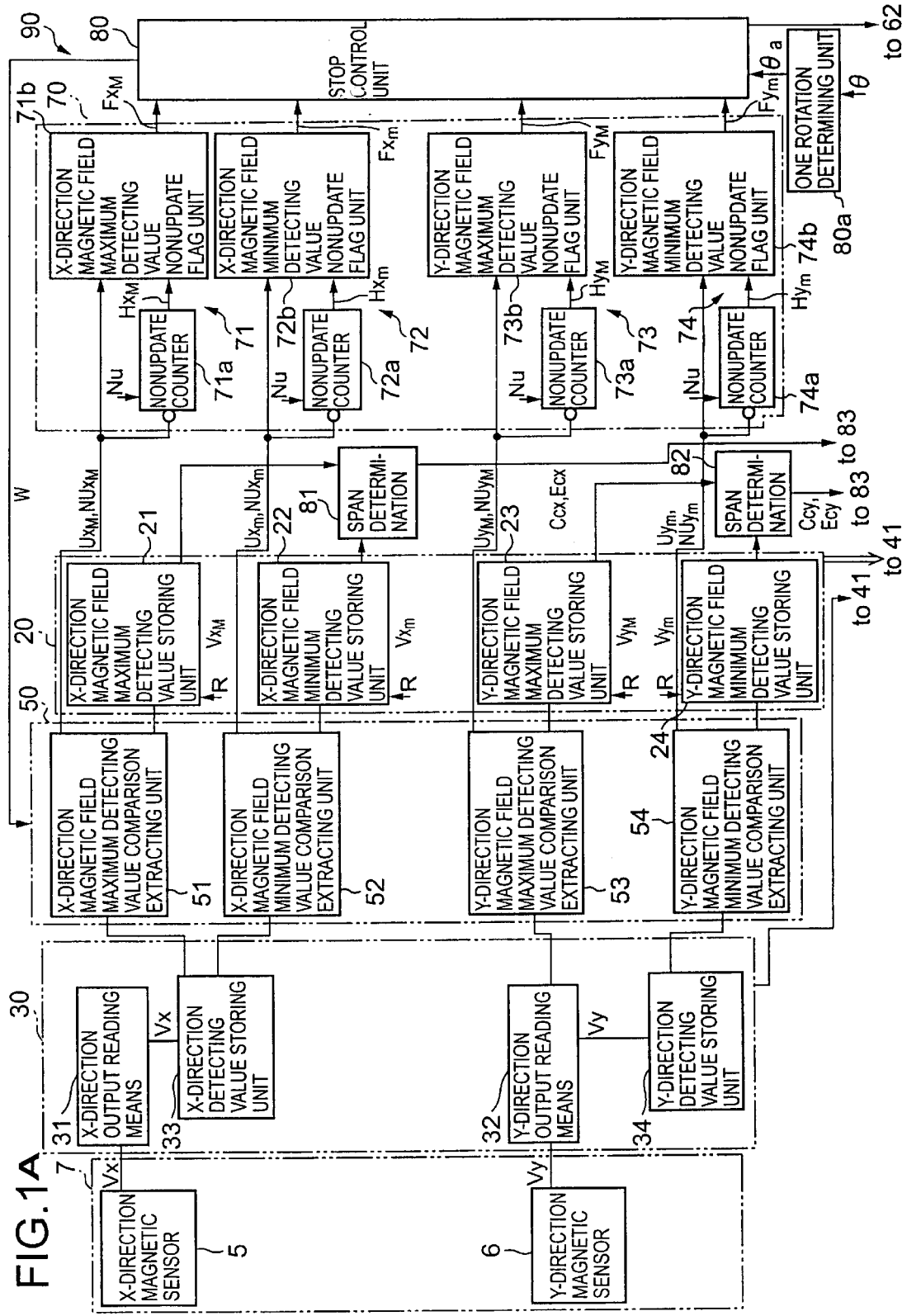
FIG. 1 is a functional block explanatory diagram of an electronic azimuth meter having a correcting mechanism according to a preferred embodiment of the invention.

Therefore, according to the electronic azimuth meter 3, typically, as shown by FIG. 1, an X-direction magnetic field maximum detecting value storing unit 21, an X-direction magnetic field minimum detecting value storing unit 22, a Y-direction magnetic field maximum detecting value storing unit 23 and a Y-direction magnetic field minimum detecting value storing unit 24, are respectively stored with the X-direction magnetic field maximum detecting value $Vx_M$, the X-direction magnetic field minimum detecting value $Vx_m$, the Y-direction magnetic field maximum detecting value $Vy_M$ and the Y-direction magnetic field minimum detecting value $Vy_m$, based on the output value Vx reading an output of the X-direction magnetic sensor 5 by X-direction reading means 31 and the output value Vy reading an output of the Y-direction magnetic sensor 6 by Y-direction reading means 32, at an azimuth angle calculating unit 41, the azimuth angle φ is calculated by φ=F (Vx, Vy, $Vx_M$, $Vx_m$, $Vy_M$, $Vy_m$), the azimuth angle φ converted into azimuth display by and azimuth display control unit 42 and azimuth display is carried out as shown by the display unit 8 of FIG. 2.

Further, although in the above-described, an explanation has been given of an example of calculating directly the azimuth angle φ (Vx, Vy) from a relationship between Vx and Vy, in place thereof, for example, as has been explained in details in Japanese Patent Application No. 15998/2000 by the inventors, by utilizing that a graph expressing respective dependence of Vx and Vy on the azimuth β becomes a closed curve the phase of which is shifted by about 90 degree relative to the azimuth β, in accordance with whether Vy (or Vx) is positive or negative, one of two kinds of relationships β1=β1 (Vx (or Vy)); $Vx_M$, $Vx_m$ (or $Vy_M$, $Vy_m$)) and β2=β (Vy (or Vx)); $Vy_M$, $Vy_m$ (or $Vx_M$, $Vx_m$)) between Vx (or Vy) and the azimuth β, may be selected and the azimuth β may be calculated from the selected relationship.

In any case, as described above, when remnant magnetization state or the like of the electronic azimuth meter main body 4 is varied, $Vx_M$, $Vx_m$, $Vy_M$ and $Yy_m$ are changed. The change of the magnetized state is caused typically, for example, by interchanging a button type battery which may be provided with weak ferromagnetism or a direction of the battery is changed by attaching or detaching the battery. Further, a similar change can be caused not only by the battery of the electronic azimuth meter main body 4 but also when a magnetized state of other electronic part or the circuit board is varied by influence of outside magnetic field in a long period of time.

When remnant magnetization of the electronic azimuth meter main body 4, further particularly, a horizontal component thereof is changed, vector sum of the remnant magnetization (horizontal component thereof) and the horizontal magnetic force is also changed and therefore, $Vx_M$, $Vx_m$, $Vy_M$ and $Yy_m$ are changed. Therefore, it is necessary to recalculate accurately values of $Vx_M$, $Vx_m$, $Vy_M$ and $Yy_m$ constituting parameters of the equation F (Vx, Vy; $Vx_M$, $Vx_m$, $Vy_M$, $Yy_m$) providing the azimuth angle ? (Vx, Vy). In FIG. 1, there is illustrated a detailed block diagram of a correcting mechanism 90 of the electronic azimuth meter 3.

The correcting mechanism 90 includes maximum value/minimum value holding means or storing means 20 of the magnetic field in X- and Y-directions, output reading/holding means (output reading/holding unit) 30 of the magnetic sensor 7, maximum value/minimum value updating means or comparison extracting means (maximum value/minimum value updating or comparison extracting unit) 50 of the magnetic field in X- and Y-directions, azimuth changing means or azimuth change inducing means (azimuth change inducing unit) 60 for providing rotational display of an induction mark M in order to induce continuous change of the azimuth of the electronic azimuth meter main body 4, predicting means (predicting unit) 70 for predicting determination of updating the maximum value/minimum value of the magnetic field in X- and Y-directions, a one rotation determining unit 80a for determining whether the electronic azimuth meter main body 4 is rotated by one rotation, in other words, whether the induction mark M is rotated by 360 degree and stop control means (update stop control unit) 80 for stopping updating of the maximum value/minimum value of the magnetic field in X- and Y-directions.

As is apparent from FIG. 1, the storing means 20 is constituted by the X-direction magnetic field maximum detecting value storing unit 21, the X-direction magnetic field minimum detecting value storing unit 22, the Y-direction magnetic field maximum detecting value storing unit 23 and the Y-direction magnetic field minimum detecting value storing unit 24 constituting storing area of $Vx_M$, $Vx_m$, $Vy_M$, $Yy_m$. The storing units 21, 22, 23 and 24 are constituted to be reset to initial values when a reset pulse R is received. The initial values may be any values so far as the values are provided with a magnitude between $Vx_M$ and $Vx_m$ with regard to X-direction and a magnitude between $Vy_M$ and $Yy_m$ with regard to Y-direction, for example, may be a middle value ($Vx_M$+$Vx_m$)/2 and a middle value ($Vy_M$+$Yy_m$)/2. Further, when $Vx_M$ and $Vy_M$ after correction become lower than the middle value before correction or when $Vx_m$ and $Vy_m$ after correction become higher than the middle value before correction, measured values immediately after starting to measure correcting operation (arrow mark 1 of FIG. 8) may constitute initial values of $Vx_M$, $Vx_m$, $Vy_M$, $Yy_m$. The storing means 20 comprises, for example, EEPROM or PROM such as an electrically rewritable flash memory of ROM 14 in FIG. 3.

Output reading/holding means 30 of the magnetic sensor 7 includes the X-direction output reading means or reading unit 31 for reading the output Vx of the X-direction magnetic sensor 5 and an X-direction detecting value storing unit 33 for storing the X-direction output or the X-direction magnetic field detecting value Vx read by the reading unit 31, and the Y-direction output reading means or the reading unit 32 for reading the output Vy of the Y-direction magnetic sensor 6 and a Y-direction detecting value storing unit 34 for storing the Y-direction output or the Y-direction magnetic field detecting value Vy read by the reading unit 32. The reading units 31 and 32 comprise the sensor drive circuit 11, the selecting circuit 12 and the A/D conversion circuit as well as related reading control program portions in FIG. 3.

The comparison extracting means 50 as updating means includes an X-direction magnetic field maximum detecting value comparison extracting unit 51 as an X-direction magnetic field maximum detecting value updating unit, an X-direction magnetic field minimum detecting value comparison extracting unit 52 as an X-direction magnetic field minimum detecting value updating unit, a Y-direction magnetic field maximum detecting value comparison extracting unit 53 as a Y-direction magnetic field maximum detecting value updating unit and a Y-direction magnetic field minimum detecting value comparison extracting unit 54 as a Y-direction magnetic field minimum detecting value updating unit.

The X-direction magnetic field maximum detecting value comparison extracting unit 51 compares a newest one of the detecting value Vx stored in the X-direction detecting value storing unit 33 with the maximum value $Vx_M$ at the time point stored in the maximum detecting value storing unit 21, replaces (updates) a value of the X-direction maximum detecting value storing unit 21 by the value Vx of the X-direction detecting value storing unit 33 when Vx>$Vx_M$ and generates an update signal $Ux_M$ indicating that the value is updated to the new maximum value and maintains the value of the X-direction maximum detecting value storing unit 21 as it is when Vx≦$Vx_M$ and generates a nonupdate signal $NUx_M$. Similarly, the X-direction magnetic field minimum detecting value comparison extracting unit 52 compares a newest one of the detecting value Vx stored in the X-direction detecting value storing unit 33 with the minimum value $Vx_m$ at the time point stored in the X-direction minimum detecting value storing unit 22, replaces (updates) a value of the X-direction minimum detecting value storing unit 22 by the value Vx of the X-direction detecting value storing unit 33 when $Vx<Vx_m$ and generates an update signal $Ux_m$ indicating that the value is updated to the new minimum value and maintains the value of the X-direction minimum detecting value storing unit 22 as it is when $Vx \geq Vx_m$ and generates a nonupdate signal $NUx_m$. Further, the Y-direction magnetic field maximum detecting value comparison extracting unit 53 compares a newest one of the detecting value Vy stored in the Y-direction detecting value storing unit 34 with the maximum value $Vy_M$ at the time point stored in the Y-direction maximum detecting value storing unit 23, updates a value of the Y-direction maximum detecting value storing unit 23 by the value Vy of the Y-direction detecting value storing unit 34 when $Vy>Vy_M$ and generates an update signal $Uy_M$ indicating that the value is updated to the new maximum value and maintains the value of the Y-direction maximum detecting value storing unit 23 as it is when $Vy \leq Vy_M$ and generates a nonupdate signal $NUy_M$. Similarly, the Y-direction magnetic field minimum detecting value comparison extracting unit 54 compares a newest one of the detecting value Vy stored in the Y-direction detecting value storing unit 34 with the minimum value $Vy_m$ at the time point stored in the Y-direction minimum detecting value storing unit 24, updates the value of the Y-direction minimum detecting value storing unit 24 by the value Vy of the Y-direction detecting value storing unit 34 when $Vy<Vy_m$ and generates an update signal $Uy_m$ indicating that the value is updated to the new minimum value and maintains the value of the Y-direction minimum detecting value storing unit 24 as it is when $Vy \geq Vy_m$ and generates a nonupdate signal $NUy_m$.

The azimuth change inducing unit 60 as azimuth change inducing means is means for rotating the induction mark M displayed on the liquid crystal display unit 8 of the electronic azimuth meter main body 4 in one direction, for example, in the clockwise direction C, is inputted with a start signal Gs for starting C direction rotation of the mark M and an induction signal P in a mode of an induction timing pulse and includes an induction angle calculating unit 61 for providing a rotational angle $\theta$ of the induction, $\theta = \omega \cdot Np$, mark M after receiving the start signal Gs display control unit 62 for executing display control of the mark M for indicating to display the mark M at a rotational position of the angle $\theta$ in an angular range $0 \leq \theta \leq_M$ set with the maximum induction angle $\theta_M$. Further, angular velocity $\omega$ designates an angle rotated at every time of inputting one induction signal or one timing pulse P to the induction angle calculating unit 61, notation Np designates a number of pulses P after the start signal Gs is provided to the induction angle calculating unit 61 and numeral 63 designates a storing unit of the maximum induction angle value $\theta_M$.

Here, the maximum induction angle value $\theta_M$ is preferably falls in a range of 360 degree $\leq \theta_M <$ 450 degree, further preferably, 360 degree $< \theta_M <$ 450 degree. Further, although there is no limit in an upper limit value, when the upper limit value becomes equal to or larger than 450 degree, a new peak is to be detected and accordingly, in order to minimize a time period requested in correcting operation, the upper limit value is smaller than 450. Further, in order to avoid influence of noise when the correcting operation is started or finished by measurement at a vicinity of the peak, there may be constituted an angle capable of sufficiently exceeding the vicinity of the peak and accordingly, the upper limit value may be typically equal to or smaller than about 405 degree (360 degree+45 degree) and actually may be equal to or smaller than about 390 degree (360 degree+30 degree). With regard to $\omega$, in order to promote measurement accuracy and restrain a correcting operation time period to be equal to or smaller than about 1 through 2 minutes, for example, $\omega=(1.5–2)$ degree/piece (in the following example, an explanation will be about 1.7 degree/piece). However, when desired, $\omega$ may be larger or smaller. In this case, further, in order to constitute rotation by about 360 through 390 degree, Np is about Np=210 through 230 pieces and accordingly, for example, when a period of repeating the pulse P is about 0.4 second/piece, it takes about 84 through 92 seconds. However, in order to further shorten the measurement time period, the period of repeating the pulse may be shortened. Further, the period of repeating the pulse P may be determined by a time period which is necessary for related program to pass through a processing loop (steps SC02 through SC06 of FIG. 5) or may be a constant time period equal to or larger than a maximum time period of the time period. In the latter case, the period may be adjustable.

In the azimuth display mode, for example, when the push button switch 2b of FIG. 2 continues to be depressed by exceeding a predetermined time period (for example, about 2 seconds) and thereafter detached, the mode is switched to an azimuth meter correcting mode, a correction operation start preparing signal is generated, the liquid crystal display unit 8 is switched to display for correcting operation, display of CALIB, the induction mark M and a mark Map representing an initial position of the mark (therefore, position of one rotation) (refer to FIG. 4A) and when the push button switch 2a is further depressed, the induction start signal Gs is generated and the correcting operation is started.

The predicting means 70 includes an X-direction magnetic field maximum value detection predicting unit 71, an X-direction magnetic field minimum value detection predicting unit 72, a Y-direction magnetic field maximum value detection predicting unit 73 and a Y-direction magnetic field minimum value detection predicting unit 74.

The X-direction magnetic field maximum value detection predicting unit 71 is constituted by an X-direction magnetic field maximum value nonupdate counter 71a which is reset to a predetermined value Nu at every time of receiving the X-direction magnetic field maximum value updating signal $Ux_M$ and which is counted down at every time of receiving the X-direction magnetic field maximum value nonupdate signal $NUx_M$ and generates a maximum value predicting signal $Hx_M$ indicating that when the counted value becomes 0, the detected value $Vx_M$ stored in the storing unit 21 at the time point, is a true value of the maximum value and an X-direction magnetic field maximum detecting value nonupdate flag unit 71b which is set by the maximum value predicting signal $Hx_M$ from the nonupdate counter 71a, erects a true value prediction flag $Fx_M$ with regard to the X-direction magnetic field maximum detecting value and is reset to thereby fall the flag $Fx_M$ for reversing the prediction that the detected value is the true value at every time of receiving the X-direction magnetic field maximum value updating signal $Ux_M$ from the X-direction magnetic field maximum detecting value comparison extracting unit 51.

Similarly, the X-direction magnetic field minimum value detection predicting unit 72 is constituted by an X-direction magnetic field minimum value nonupdate counter 72a which is reset to a predetermined value Nu at every time of receiving the X-direction magnetic field minimum value updating signal $Ux_m$ and which is counted down at every time of receiving the X-direction magnetic field minimum value nonupdate signal $NUx_m$ and generates a minimum value predicting signal $Hx_m$ indicating that when the counted value becomes 0, the detected value $Vx_m$ stored in the storing unit 22 at the time point, is a true value of the minimum value and an X-direction magnetic field minimum detecting value nonupdate flag unit 72b which is set by the minimum value predicting signal $Hx_m$ from the nonupdate counter 72a, erects a true value prediction flag $Fx_m$ with regard to the X-direction magnetic field minimum detecting value and is reset to thereby fall the flag $Fx_m$ for reversing the prediction that the detected value is the true value at every time of receiving the X-direction magnetic field minimum value updating signal $Ux_m$ from the X-direction magnetic field minimum detecting value comparison extracting unit 52.

Further, the Y-direction magnetic field maximum value detection predicting unit 73 is constituted by a Y-direction magnetic field maximum value nonupdate counter 73a which is reset to a predetermined value Nu at every time of receiving the Y-direction magnetic field maximum value updating signal $Uy_M$ and which is counted down at every time of receiving the Y-direction magnetic field maximum value nonupdate signal $NUy_M$ and generates a maximum value predicting signal $Hy_M$ indicating that when the counted value becomes 0, the detected value $Vy_M$ stored in the storing unit 23 at the time point, is a true value of the maximum value and a Y-direction magnetic field maximum detecting value nonupdate flag unit 73b which is set by the maximum value predicting signal $Hy_M$ from the nonupdate counter 73a, erects a true value prediction flag $Fy_M$ with regard to the Y-direction magnetic field maximum detecting value and is reset to thereby fall the flag $Fy_M$ for reversing the prediction that the detected value is the true value at every time of receiving the X-direction magnetic field maximum value updating signal $Uy_M$ from the Y-direction magnetic field maximum detecting value comparison extracting unit 53.

Further, the Y-direction magnetic field minimum value detection predicting unit 74 is constituted by a Y-direction magnetic field minimum value nonupdate counter 74a which is reset to a predetermined value Nu at every time of receiving the Y-direction magnetic field minimum value updating signal $Uy_m$ and which is counted down at every time of receiving the Y-direction magnetic field minimum value nonupdate signal $NUy_m$ and generates a minimum value predicting signal $Hy_m$ indicating that when the counted value becomes 0, the detected value $Vy_m$ stored in the storing unit 24 at the time point, is a true value of the minimum value and a Y-direction magnetic field minimum detecting value nonupdate flag unit 74b which is set by the minimum value predicting signal $Hy_m$ from the nonupdate counter 74a, erects a true value prediction flag $Fy_m$ with regard to the Y-direction magnetic field minimum detecting value and is reset to thereby fall the flag $Fy_m$ for reversing the prediction that the detected value is the true value at every time of receiving the Y-direction magnetic field minimum value updating signal $Uy_m$ from the Y-direction magnetic field minimum detecting value comparison extracting unit 54.

Further, instead of constituting the nonupdate counter such that the nonupdate counter is reset to the predetermined value Nu and counted down by the nonupdate signal and the counted value become 0 so far as the nonupdate signal can be counted, the nonupdate counter may be operated otherwise such that the nonupdate counter is constituted to count the nonupdate signal until the nonupdate counter is reset to be 0 and becomes the predetermined value Nu.

The one rotation determining unit 80a receives the induction angle signal θ from the induction angle calculating unit 61, determines whether θ≧360 degree and when θ is equal to or larger than 360 degree, the one rotation determining unit 80a generates a signal θa indicating thereof.

The stop control unit 80 as stop control means predicts that the correcting operation has been finished when there are brought about the states $Fx_M$, $Fx_m$, $Fy_M$ and $Fy_m$ indicating that all of the predicting units 71, 72, 73 and 74 of the maximum values $Vx_m$ and $Vy_m$ and the minimum values $Vx_m$ and $Vy_m$ in X-direction and Y-direction are true values and when the signal θa indicating that one rotation is reached from the one rotation determining unit 80a and generates a correction stop or correction finish predicting signal W to the updating unit 50, that is, the respective updating units (respective comparison extracting units) 51, 52, 53 and 54 to thereby stop the updating processing. Further, the correction finish predicting signal W is provided also to the induction mark display control unit 62 to thereby stop induction by the induction mark M. Further, although not illustrated in FIG. 3 for simplifying the drawing, the correction finish predicting signal W is also provided to an X-direction span determining unit 81 and a Y-direction span determining unit 82 and span determining operation by the span determining units 81 and 82 is started.

The X-direction span determining unit 81 compares the X-direction magnetic field maximum detecting value $Vx_M$ and the X-direction magnetic field minimum detecting value $Vx_m$ to determine whether a difference therebetween $\Delta Vx = Vx_M - Vx_m$ is equal to or larger than a predetermined span value Sx when the correction finish predicting signal W is received from the stop control unit 80, regards that the X-direction magnetic field maximum detecting value $Vx_M$ and the X-direction magnetic minimum detecting value $Vx_m$ have been detected correctly in the case in which the difference is equal to or larger than the predetermined span value Sx and generate an X-direction magnetic field maximum/minimum value correction finish signal Cxc and regards that at least one of the X-direction magnetic field maximum detecting value $Vx_M$ and the X-direction magnetic field minimum detecting value $Vx_m$ is not correctly detected in the case in which the difference is equal to or smaller than the predetermined span value Sx and generates an X-direction magnetic field maximum/minimum value correction failure signal Exc. The predetermined span value Sx may be a given constant value (for example, constant value of about 10 μT) or a value produced by multiplying the difference S0x between the maximum value $Vx_M$ and the minimum value $Vx_m$ before correction multiplied by a predetermined rate (for example, about 80 through 90%, may be larger or smaller), may be calculated and used as the predetermined span value.

Similarly, the Y-direction span determining unit 82 compares the Y-direction magnetic field maximum detecting value $Vy_M$ and the Y-direction magnetic field minimum detecting value $Vy_m$ to determine whether a difference therebetween $\Delta Vy = Vy_M - Vy_m$ is equal to or larger than a predetermined span value Sy when the correction finish predicting signal W is received from the stop control unit 80, regards that the Y-direction magnetic field maximum detecting value $Vy_M$ and the Y-direction magnetic field minimum detecting value $Vy_m$ have been detected correctly when the difference is equal to or larger than the predetermined span value Sy and generates a Y-direction magnetic field maximum/minimum value correction finish signal Cyc and regards that at least one of the Y-direction magnetic field maximum detecting value $Vy_M$ and the Y-direction magnetic field minimum detecting value $Vy_m$ has not been detected correctly when the difference is equal to or smaller than the predetermined span value Sy and generates a Y-direction magnetic field maximum-minimum value correction failure signal Eyc. The span value Sy may be provided similar to the span value Sx except that the span value Sy relates to Y-direction.

In accordance with determination results of the X-direction and Y-direction span determining units 81 and 82, a span general determining unit 83 generates correction finish signal Ccf when both of the finish signals Ccx and Ccy are constituted and makes the liquid crystal display unit 8 display thereof along with sound of, for example, "beep, beep, beep" (FIG. 4G, mentioned later) and when at least one of them is the failure signal Ecx or Ecy, the span general determining unit 83 generates a correction failure signal Ecf and makes the liquid crystal display unit 8 display thereof along with sound of, for example, "beep" (FIG. 4H, mentioned later).

Next, an explanation will be given of correcting operation by the correcting mechanism constituted as described above in reference to FIG. 4 through FIG. 8.

In the correcting operation, for example, the electronic azimuth meter 3 is brought into substantially a horizontal state such that X-Y plane of FIG. 2 becomes horizontal and in view of the horizontal plane, the electronic azimuth meter 3 is brought into a state in which a lower side thereof in FIG. 2 is disposed on this side and left and right sides thereof are disposed to the left and to the right of FIG. 2 and the push button switch 2b (refer to FIG. 2) for instructing to switch to the correcting operation is depressed for about 2 seconds or more.

By a correcting operation start preparing signal accompanied by depression and release of the switch 2b, on one side, the maximum and minimum detecting value storing unit 20, that is, 21, 22, 23 and 24 of X-direction and Y-direction magnetic fields, are initialized (step SC01 of FIG. 5 which is a flowchart generally showing a total of the correcting operation). The initial values may be any values so far as the values are provided with a magnitude between $Vx_M$ and $Vx_m$ with regard to X-direction and a magnitude between $Vy_M$ and $Vy_m$ with regard to Y-direction, for example, middle values of original maximum values and original minimum values (($Vx_M+Vx_m$)/2 and ($Vy_M+Vy_m$)/2) are calculated and stored as initial values. Further, when $Vx_M$ and $Vy_M$ after correction are lower than the middle values before correction or when $Vx_m$ and $Vy_m$ are higher than the middle values before correction, measured values (arrow mark 1 of FIG. 8) immediately after starting the correcting operation and measurement may constitute initial values of $Vx_M$, $Vx_m$, $Yy_M$ and $Vy_m$. Further in the resetting operation, the original values $Vx_M$, $Vx_m$, $Vy_M$ and $Vy_m$ are held in respective history holding units (not illustrated). The held values are reread to the storing units 21 through 24 to be brought back to the state before starting the correcting operation when the correcting operation is interrupted at midway. Further, when desired, the held values can be used as, for example, reference values for checking whether the magnitude of the variation before and after correcting the respective values is excessive after span determination.

On the other side, by the correcting operation start preparing signal, display of the liquid crystal display unit 8 is switched to a display screen 8a of the correction mode as shown by FIG. 4A. In the display screen 8a, there are shown display "CALIB" indicating the correction mode or the calibration mode and the mark Map representing an initial position in the up and down direction (initial direction). Further, as explained later, the mark Map is overlappingly displayed with the winking induction mark M. However, mark Map and the induction mark M may be displayed in different diagrams or colors (step SC01 of FIG. 5).

When the push button switch 2a is depressed again in the state of the correction operation preparing screen, the induction start signal Gs is outputted and by the induction start signal Gs, there is started counting of the number Np of the induction signal timing pulse P at the induction angle calculating unit 61 of the azimuth change inducing unit 60 as the azimuth change inducing means. Further, the induction mark display control unit 62 starts display control for displaying the winking type induction mark M at an angular position of $\theta=\omega \cdot Np$ and as shown by FIG. 1 and FIG. 4A, the induction mark M starts rotating in the clockwise direction C at a determined constant speed $\omega c$ ($=\omega \cdot Np$)/t, here, t designates a time period after starting the correcting operation). Although an explanation will be given as follows such that $\omega c$=about 360 degree/80 seconds (about 4.5 degree per second) and Np about Np=10 times/4 seconds=2.5 times/second, $\omega c$ or Np may be of desired magnitudes in accordance with convenience of user.

In accordance with rotation of the winking induction mark M in C direction, the user rotates the electronic azimuth meter main body 4 in the counterclockwise direction Cr at constant speed of $-\omega c$, for example, while holding the electronic azimuth meter 3 in the horizontal state such that the induction mark M is disposed at the same position (direction) relative to the user (refer to FIGS. 4A through 4F). Thereby, direction or azimuth of the magnetic sensor, that is, the X-direction magnetic sensor 5 and the Y-direction magnetic sensor 6 integral with the electronic azimuth meter main body 7, are also changed at the constant speed of $-\omega c$ and therefore, while changing the azimuth substantially at the constant speed of $-\omega c$, by the X-direction magnetic sensor 5 and the Y-direction magnetic sensor 6, the magnetic field is detected and the detecting outputs Vx and Vy can be taken out. In FIG. 4, FIG. 4B shows a state in which the electronic azimuth meter main body 4 is rotated in Cr direction by 90 degree such that the winking induction mark M is held at the upper position. Similarly, FIGS. 4C, 4D and 4E show states in which the electronic azimuth meter main body 4 is rotated in Cr direction, respectively by 180 degree, 270 degree and 360 degree and FIG. 4F shows a state in which the electronic azimuth meter main body 4 is rotated in Cr direction further from 360 degree (in illustrated example, state of rotating about 400 degree) such that the winking type induction mark M is held at the upper position.

In accordance with the correcting operation start signal Gs, there is started to output the output values Vx and Vy for reading and detecting the magnetic field by the output reading and holding means 30 of the magnetic sensor 7 (step SC03 of FIG. 5). The detecting output values Vx and Vy are varied as shown by curves designated by Vx and Vy in FIG. 8 in which the abscissa indicates the number of times of reading substantially in correspondence with rotational angle (in this example, 2.5 times/second). The detecting outputs at a first time correspond to points of left ends of the curves Vx and Vy in FIG. 8. Here, as is apparent from FIG. 8, there is taken an example of the case in which correction of the azimuth is started in a state in which the electronic azimuth meter 3 is directed substantially in magnetic north.

At the first position, when reading step SC03 of FIG. 5 has been finished, the operation proceeds to X-axis maximum value/minimum value updating step SC04 and Y-axis maximum value/minimum value updating step SC05. As initial magnetic field detecting output reading and storing values, values at a position (direction) before the mark M starts moving may be adopted or values at a position at which the mark M has rotated by one step may be adopted. Further, rotation by 360 degree or more signifies that there is a point (direction) of providing initial magnetic field detecting output reading and storing values as a reference, the magnetic field detecting output values are read and stored and extracted for comparison until a point (direction) coinciding with the point or a point (direction) exceeding thereof.

Figure 6:
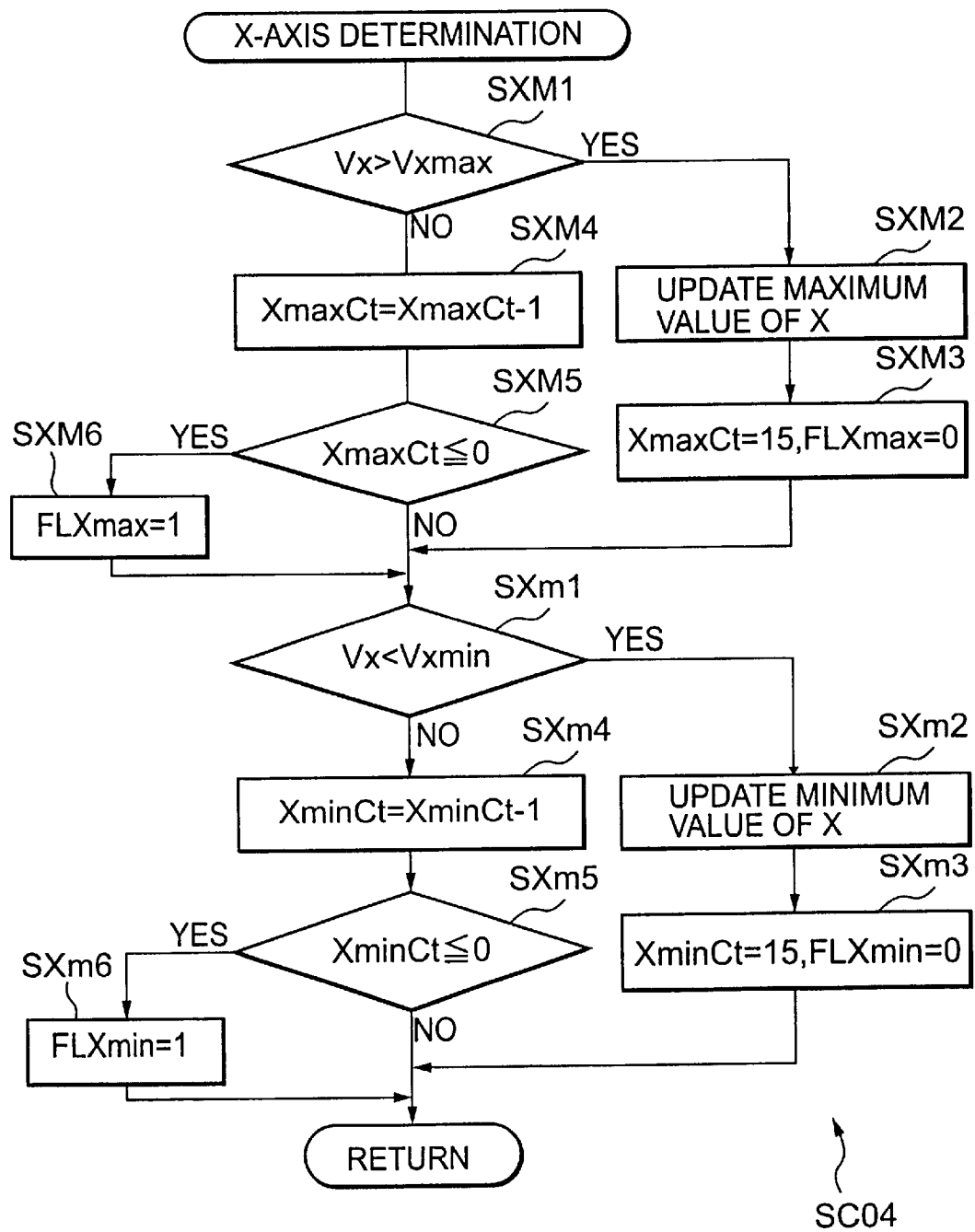
FIG. 6 shows a detailed flowchart of a maximum value/minimum value updating step in the flowchart of FIG. 5 and is a flowchart of the maximum value/minimum value updating step of an X-direction magnetic field detecting value.
Figure 8:
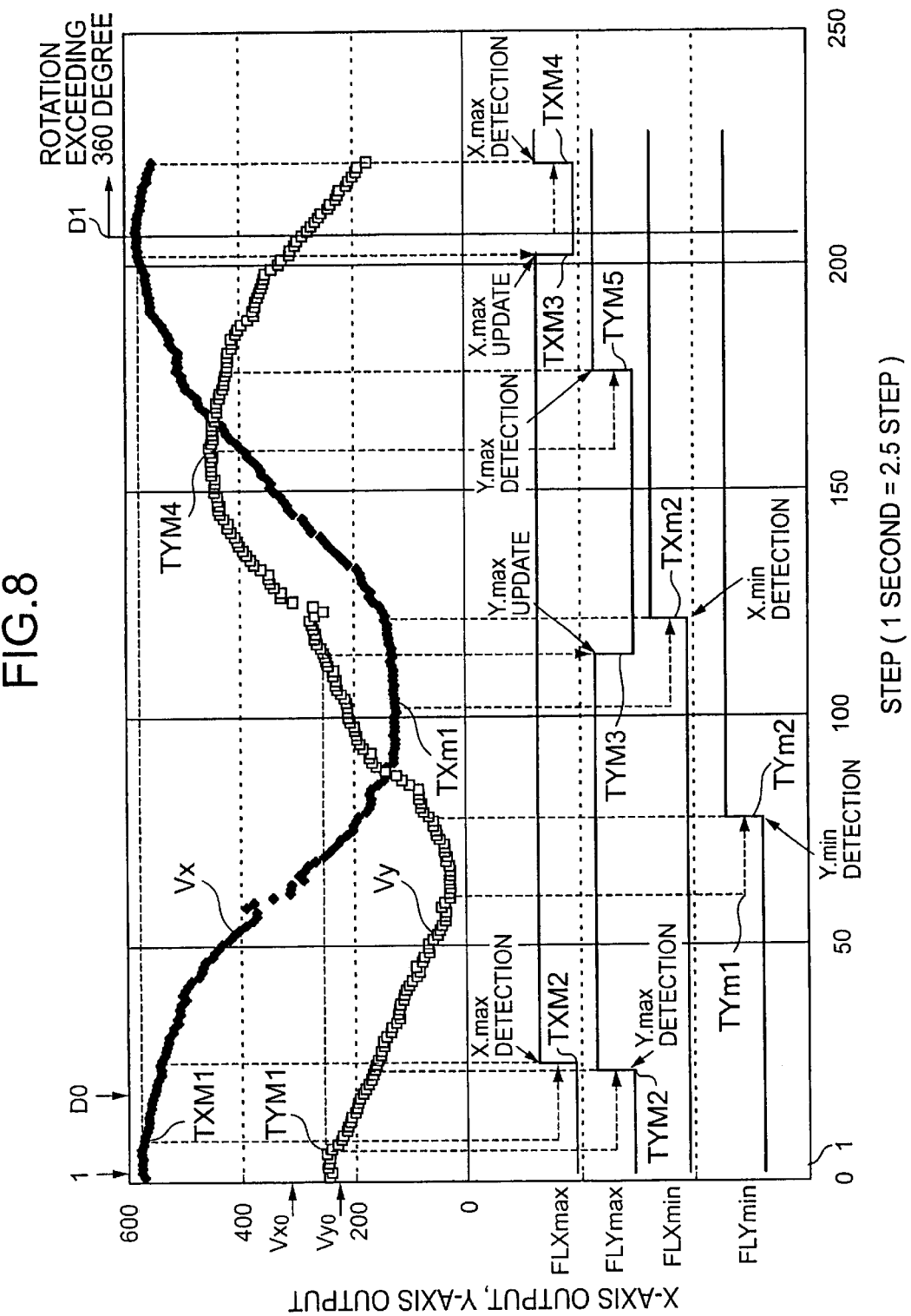
FIG. 8 is a graph showing an example of the correcting operation in the electronic azimuth meter of FIG. 1.

Details of step SC04 are shown by a flowchart of FIG. 6. That is, at step SC04, as shown by FIG. 6, it is compared whether the X-direction magnetic field detecting output value Vx which is newly read and stored to the X-direction detecting value storing unit 33 is larger than the maximum value $Vx_M$ (which is initially reset and disposed at a position indicated by $Vx_0$ in FIG. 8) stored to the X-direction magnetic field maximum value storing unit 21 (step SXM1, further, in the flowchart, $Vx_M$ is designated as Vxmax, the same as follows). This corresponds to a processing at the maximum detecting value comparing and extracting unit 51 of FIG. 1. In this example, as shown by FIG. 8, the detecting value $Vx>Vx_M=Vx_0$ and accordingly, the operation proceeds to step SXM2, the maximum value of X is updated, further, the nonupdate flag $Fx_M$ is reset and the nonupdate counter 71a is set to initial value Nu=15 (step SXM3).

Further, although according to the embodiment, an explanation will be given by setting Nu as Nu=15 in all of the followings, Nu may be made, for example, initially adjustable in accordance with by what degree of width inversion of a peak value is caused at a vicinity of a peak by influence of noise and Nu may be smaller than 15 (for example, may be about 2 through 3 or may be 1 depending on cases) or may be larger than 15 (particularly, Nu may be adopted to be larger than 15 when influence of noise is considerable or a measured angle interval is small). In FIG. 6, the held value of the counter 71a is designated by XmaxCt. In the block diagram of FIG. 1, step SXM2 corresponds to updating and storing the new detecting value Vx as the new maximum value $Vx_M$ to the X-direction magnetic field maximum detecting value storing unit 21. Further, step SXM3 corresponds to resetting the flag $Fx_M$ of the X-direction magnetic field maximum detecting value nonupdate flag unit 71b by the update signal $Ux_M$ and setting the X-direction magnetic field maximum detecting value nonupdate counter 71a to Nu=15.

In FIG. 6, in the case of $Vx \leq Vx_M$, the operation proceeds from step SXM1 to step SXM4 and nonupdate count value XmaxCt is reduced by one. In the block diagram of FIG. 1, this corresponds to that in the case of $Vx \leq Vx_M$ in the block diagram of FIG. 1, the maximum value $Vx_M$ in the maximum value storing unit 21 is not updated, the nonupdate signal $NUx_M$ is generated, the state of the X-direction magnetic field maximum detecting value nonupdate flag unit 71b is not changed and the nonupdate counter 71a is counted down by 1 (FIG. 6). At step SXM5, it is determined whether magnitude of the nonupdate counter value XmaxCt is equal to or smaller than 0 and when the nonupdate counter value XmaxCt becomes equal to or smaller than 0, that is, when nonupdate of the X-direction magnetic field maximum detecting value $Vx_M$ is repeated continuously, that is, consecutively by 15 times, the prediction flag FLXmax indicating that the maximum value is provided, is set to 1 (step SXM6). The step SXM6 corresponds to that the nonupdate counter 71a become 0 or negative, the maximum value predicting signal $Hx_M$ is provided from the nonupdate counter 71a to the nonupdate flag unit 71b and the maximum value predicting flag signal $FX_M$ in correspondence with FLXmax of the flowchart is outputted from nonupdate flag unit 71b. Further, when XmaxCt is positive, the state of the flag FLmax remains unchanged and the operation proceeds to successive minimum value determination or determining processing.

At minimum value determination processing steps SXm1, SXm2, SXm3, SXm4, SXm5 and SXm6, there are carried out processings similar to those of the above-described steps SXM1, SXM2, SXM3, SXM4, SXM5 and SXM6 except that there is carried out a predicting processing with regard to the minimum value $Vx_m$ in place of the maximum value $Vx_M$ in X-direction, the count value of the counter 72a is represented by XMinCt and the minimum value predicting flag signal $Fx_m$ is represented by FLXmin.

That is, in this example, firstly, it is compared whether the X-direction magnetic field detecting output value Vx which is newly read and stored to the X-direction detecting value storing unit 33, is smaller than the minimum value $Vx_m$ (which is initially reset and becomes $Vx_0$) stored to the X-direction magnetic field minimum detecting value storing unit 22 (step SXm1, further, in the flowchart, $Vx_m$ is designated as Vxmin, the same as follows). This corresponds to the processing at the minimum detecting value comparing and extracting unit 52 of FIG. 1. In this example, as shown by FIG. 8, the detecting value $Vx>Vx_m=Vx_0$ and accordingly, the operation proceeds to step SXm4, the nonupdate counter value XminCt of X is subtracted from the set value XminC=15 in resetting the minimum value by one to 14 (step SXm4, further, the value XminCt of the nonupdate counter 72a is forcibly set to initial value Nu=15 in starting the correcting operation), it is determined that XminCt≦0 is not established (step SXm5) and the operation returns. These steps correspond to that with regard to the flag unit 72b, the flag $Fx_m$ is reset by the update signal $Ux_m$ or is maintained in the reset state, in the nonupdate counter 72a, null, that is, 0 of the predetermined value is not reached and accordingly, the nonupdate flag setting signal $Hx_m$ is not outputted.

Figure 7:
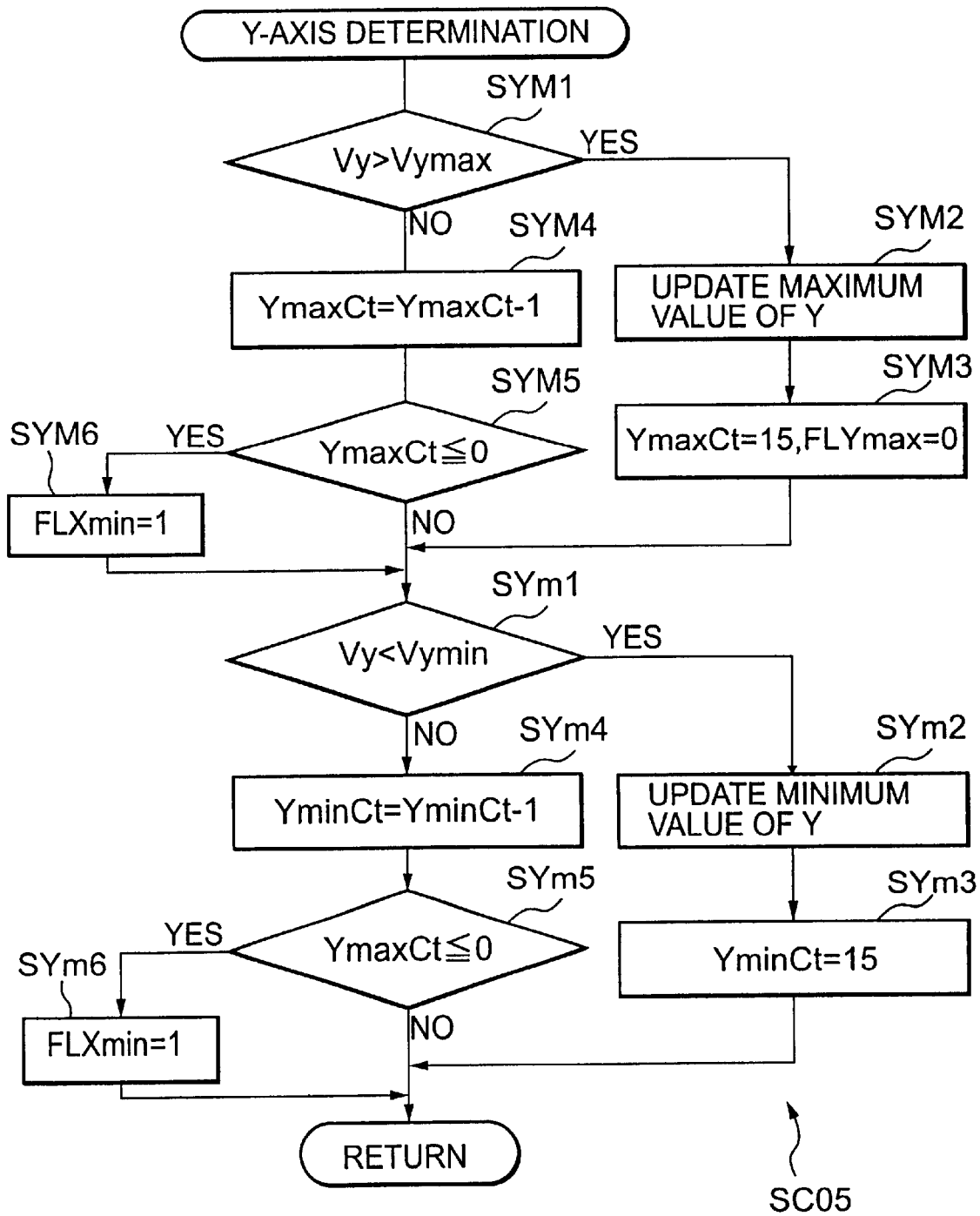
FIG. 7 shows a detailed flowchart of a maximum value/minimum value updating step in the flowchart of FIG. 5 and is a flowchart of the maximum value/minimum value updating step of a Y-direction magnetic field detecting value.

In this way, when the X-axis maximum value/minimum value updating processing step SC04 of FIG. 5 has been finished, successively, the operation proceeds to Y-axis maximum value/minimum value updating processing step SC05. As shown by FIG. 7, the step SC05 is constituted by maximum value predicting steps SCYM1 through SCYM6 similar to the maximum value predicting steps SCXM1 through SCXM6 and minimum value predicting steps SCYM1 through SCYm6 similar to the minimum value predicting steps SCXm1 through SCXm6 except that the axis is Y in place of X.

At a point at which a value of the abscissa of FIG. 8 is "1", in detecting the Y-direction magnetic field at a first time, the magnetic field detecting value by the Y-direction magnetic sensor 6 is read by the Y-direction reading means 32 and stored to the Y-direction detecting value storing unit 34 as the detecting output Vy of the Y-direction magnetic field and, at step SYM1, compared with the maximum value $Vy_M$ stored to the Y-direction magnetic field maximum detecting value storing unit 23. When at first, $Vy_M$ is original middle value $Vy_0$, since the $Vy>Vy_M=Vy_0$, the operation proceeds to step SYM2, the maximum value $Vy_M$ of Y of the storing unit 23 is replaced or updated by Vy, further, the Y-direction maximum flag $Fy_M$=FLmax is reset to 0, the value FmaxCt of the nonupdate counter 73a is reset to maximum value Nu=15 and the operation proceeds to step SYm1 with regard to the Y-direction minimum value. At step SYm1, the detecting value Vy is compared with the minimum value $Vy_m$ stored to the Y-direction magnetic field minimum detecting value storing unit 24. At first, $Vy_m=Vy_0$ and therefore, $Vy>Vy_m$ and therefore, while maintaining the minimum value $Vy_m$ of the storing unit 24, the operation proceeds to step SYm4, based on the set value Nu=YminCt= 15 by resetting in starting the correcting operation, by count down, YminCt=14 is provided and it is determined as No at step Sym5 to thereby finish step SC05 and step SC06 of FIG. 5 is reached.

At step SC06, it is checked whether the indicator, that is, the winking induction mark M is rotated by one rotation (rotation by 360 degree) (which corresponds to the processing by the one rotation determining unit 80a of FIG. 1) and when one rotation is not carried out, the operation returns to step SC02 and proceeds to magnetic field measurement at a second time.

When the operation returns to a step SC02, the induction pulse signal P is generated, at the induction angle calculating unit 61, there is carried out a calculation of increasing angle by 1 step and via the induction mark display control unit 62, the winking induction mark M of the liquid crystal display unit 8 is rotated in C direction by one step (about 1.74 degree). Therefore, the user rotates the electronic azimuth meter main body 4 in the counterclockwise direction Cr by about 1.74 degree, thereby, the azimuth of the magnetic field detected by the X-direction and the Y-direction magnetic sensors is changed by an amount of 1.74 degree.

In this way, processings of step SC02 through SC05 are repeated until the winking induction mark M is rotated by one rotation. In this example, the winking induction mark M is rotated by 360 degree by rotating respectively by about 1.74 degree and 208 times of rotational movement. Further, during a time period of 1 second, 2.5 times of rotational movement is carried out and accordingly, about 83 seconds are taken to carry out one rotation. Therefore, for example, in the case of 15 times of rotational movement, the induction mark M is rotated by about 26 degree. However, a number of times of rotational movement in one second may be larger or smaller and unit angle of the rotational movement may be smaller or larger than that of the example. For example, in the case of an indicator time piece, in consideration of the fact the hand makes one turn by 60 steps, the unit angle of rotational movement of the induced hand may be set to 6° and the hand may be moved substantially at each 1.4 seconds. The same goes with the case of a liquid crystal display time piece, further, in order to promote visual recognizing performance, it is preferable to arrange the winking induction mark M at an outer periphery thereof.

When the rotational angle θ of the induction mark M becomes equal to or larger than 360 degree, the determination at step SC06 is Yes and the operation reaches successive flag determining step SC07. According to the flag determination, it is determined whether all of the flags FLXmax, FLXmin, FLYmax and FLYmin, (respectively in correspondence with $Fx_M$, $Fx_m$, $Fy_M$, $Fy_m$ of FIG. 2) are erected and become 1, that is, whether flag product FL=FLXmax·FLXmin·FLYmax·FLYmin=1 is established.

Next, an explanation will be given of how the flags FLXmax, FLXmin, FLYmax, FLYmin are varied in reference to the flowcharts of FIG. 6 and FIG. 7 and the graph of FIG. 8.

First, with regard to the flag FLXmax concerning the X-direction magnetic field maximum detecting value $Vx_M$, in order to erect the flag FLXmax, it is necessary to reach step SXM6 of FIG. 6 and in order to carry out the operation, in FIG. 6, it is necessary that the X-direction magnetic field detecting value Vx is reduced, the maximum value $Vx_M$ is not updated, the determination at step SXM1 is No, the operation proceeds to step SXM4, count down of the count value XmaxCt of the nonupdate counter 71a is repeated continuously by 15 times and the determination of the step SXM5 is Yes (the same goes with other three flags).

Meanwhile, the X-direction magnetic field detecting value Vx is changed to reduce initially at a point TXM1 of FIG. 8. Therefore, at and after the point TXM1, the operation proceeds from step SXM1 to SXM5 via SXM4, and when the abscissa reaches a coordinate position TXM2 in correspondence with measurement position later than TXM1 by 15 times (location at which a value of a number of times of abscissa is about 25 times) is reached, as shown by FIG. 8, the flag FLXmax is changed from 0 to 1. The state is maintained up to a point TXM3 as mentioned later.

Meanwhile, with regard to the Y-direction magnetic field minimum detecting value $Vy_m$, Vy is changed to increase at a point TYm1, at and after the point TYm1, count down of the corresponding nonupdate counter FLYmin is started and when a coordinate position TYm2 in correspondence with measurement position later than that of the point TYm1 by 15 times (location at which a value of number of times of abscissa is about 80 time) is reached, the corresponding flag FLYmin is set and changed from 0 to 1.

Similarly, with regard to the X-direction magnetic field minimum detecting value $Vx_m$, Vx is changed to increase at the point TXm1, at and after the point TXm1, count down of the corresponding nonupdate counter FLXmin is started and when a coordinate position TXm2 in correspondence with measurement position later than the point TXm1 by 15 times (location at which a value of a number of times of abscissa is about 125 times) is reached, the corresponding flag FLXmin is set and is changed from 0 to 1.

Further, with regard to the Y-direction magnetic field maximum detecting value $Yy_M$, Vy is changed to reduce at a point TYM1, at and after the point TYM1, count down of the corresponding nonupdate counter FLYmax is started, when a coordinate position TYM2 in correspondence with measurement position later than the point TYM1 by 15 times (location at which a value of a number of times of the abscissa is about 25 times) is reached, the corresponding flag FLYmax is set and is changed from 0 to 1. However, with regard to Y, measurement is started originally not from a vicinity of the maximum value but from a vicinity of the middle value and accordingly, when a coordinate position TYM3 (location at which the value of the number of times of the abscissa is about 120 times) is reached, Vy exceeds the predicted maximum value $Vy_M$ at the point TYM1, the flag FLYmax is reset and falls from 1 to 0. Thereafter, when a point TYM4 is reached, Vy is changed to reduce, at and after the point TYM4, count down of the corresponding nonupdate counter FLYmax is started and when a coordinate position TYM5 in correspondence with measurement position later than the point TYM4 by 15 times (location at which the value of the number of times of the abscissa is about 175 times) is reached, the corresponding flag FLYmax is set again and is changed from 0 to 1.

The respective flags are varied as described above and accordingly, in FIG. 8, in a state in which rotational movement of about 175 times and detection and maximum/minimum determination of the X-direction and Y-direction magnetic fields have been carried out, all of the flags FLXmax, FLXmin, FLYmax and FLYmin are set to 1.

However, at this stage, the induction mark M and accordingly, the electronic azimuth meter main body 4 is rotated only by about 305 degree, one rotation (rotation by 360 degree) is not carried out and therefore, at step SC06 of FIG. 5 in correspondence with operation of the one rotation determining unit 80a of FIG. 1, the determination is No and accordingly, the flag determining processing SC07 is not reached and these flags are not predicted as true values yet.

This is because, for example, in FIG. 8, as shown by an arrow mark D0, as is known by assuming a case in which the correcting operation is started from an azimuth at which both Vx and Vy gradually reduce, in a range for rotating the induction mark M from the position by about 300 degree, Vx is not directed to an azimuth adopting the maximum value and the maximum value of Vx is not observed. That is, in order to measure the maximum values/minimum values of Vx and Vy, it is indispensable to carry out rotation by 360 degree in consideration of arbitrariness of initial azimuth in the correcting operation. Here, although characteristic within a range of about 90 degree is observed, inherently, Vx and Vy provide azimuth dependent output waveforms the phases of which are shifted by substantially 90 degree and maximum or minimum peaks of Vx and Vy are to be repeated substantially at each 90 degree and therefore, things which are considered with regard to the range of about 90 degree can be generalized as they are in all the angular range.

In FIG. 8, in a range in which the value of the number of times of the abscissa is from about 175 to about 205, in the state in which all of the flags FLXmax, FLXmin, FLYmax and FLYmin are set to 1, when the determination at step SC06 is No from the reason that the rotational angle is deficient, steps SC02 through SC05 are repeated.

However, at a vicinity of a value of a number of times at which Vx reaches an upper peak, that is, the maximum value, azimuth dependency (dependency of value of number of times) of the value of Vx is reduced, Vx becomes substantially the same degree of magnitude and the graph lies horizontally. Meanwhile, the magnitude of the geomagnetism is small as is well known, the magnetic field detecting output is also reduced (for example, becomes voltage output of $\mu V$ order) and therefore, influence of various noises are liable to be effected. Therefore, at the vicinity of the peak, it is difficult to disregard influence of noise which can be superposed positively or superposed negatively. According to the measurement example shown in FIG. 8, at position TXM3, noise is superposed positively and there is established Vx (TXM3)>Vx$_M$=Vx (TXM1). Then, the flag FLXmax falls at the point TXM3 and become 0. Further, according to the example, actually, noise is superposed positively even at the point TXM1 and the original peak is to be disposed on a side at which the value of the number of times (abscissa) is smaller. However, when the rotation is induced to exceed 360 degree as in the embodiment of the present invention, it is not necessary to consider in details, at which rotational position and in which direction noise is superposed on the magnetic field detecting output.

After such a change of the flag FLXmax, the operation proceeds from step SC04 to Step SC05, further, from step SC06 back to step SC02 and processing of steps SC02 through SC05 are repeated again. In this example, at and after the position TXM3, the maximum value Vx$_M$ is not updated, and count down of the count value XmaxCt of the nonupdate counter 71$a$ is carried out again.

Meanwhile, when an abscissa position D1 of FIG. 8 is reached, the rotational angle θ reaches 360 degree. At this occasion, the flag FLXmax stays to fall to 0.

Therefore, when the correcting operation is going to finish assumedly in this state, the flag product FL becomes 0 and the correcting operation is failed.

However, according to the case of the embodiment, rotation exceeding 360 degree is permitted and therefore, the inherent flag determination is carried out only after the determination at step SC06 is Yes (step SC07), when the flag product FL is 0, the determination is No, the operation returns to step SC02 and steps SC02 through SC05 are repeated. Although at this stage, the determination at step SC06 is yes and step SC07 is reached, step SC02 through SC06 are repeated until the nonupdate counter XamxCt is counted down and falls to 0. As a result, a position TXM4 at about 220-th times (location of about 383 degree) is reached, finally, the nonupdate counter XmaxCt become 0 at step SXM5 of FIG. 6 in step SC04 of FIG. 5 (it is predicted that the maximum value is present at a position of about 205-th time earlier by 15 times, that is, at about 357 degree), the flag product FL is determined to be 1 at step SC07 (in correspondence with operation of the stop control unit 80) only after the flag FLXmax is set to 1 at step SXM6 and steps SC04 through SC06 have been carried out and the operation proceeds to successive span determination processing step SC08.

At span determination processing step SC08 of FIG. 5 in correspondence with the span determining units 81, 82 and 83 of FIG. 1, with regard to respectives of X-direction and Y-direction, it is determined whether differences between the maximum values and the minimum values of ΔVx=VxM−Vxm and ΔVy=VyM−Vym are equal to or larger than predetermined values, when both of the differences are equal to or larger than the predetermined values, pass display step SC09$a$ indicating Yes is reached, correcting operation success or finish display (PASS) as shown by FIG. 4G is displayed by the liquid crystal display unit 8 and predetermined finish sound (for example, "beep, beep, beep") is emitted and when at least one of them does not reach the predetermined value, error display step SC09$b$ indicating No is reached, error display (ERROR) as shown by FIG. 4H is indicted by the liquid crystal display unit 8 and predetermined error sound (for example "beep") is emitted.

When the correcting processing has been finished, any of the push button switches 2$a$, 2$b$, 2$c$ and 2$d$ of the electronic azimuth meter main body 4 may be depressed to thereby return to the azimuth display mode and measurement of the azimuth may be carried out.

Although according to the example of FIG. 8, an explanation has been given of an example of starting the azimuth correction from the vicinity of the peak, when the correcting operation is started from the azimuth shifted from the azimuth constituting the peak (east, west, south, north), for example, by about 45 degree, at a location at which the rotation has been carried out substantially by about 315 degree+25 degree (amount of 15 counts), all of the flags are erected, right at a vicinity of one rotation, the X- and Y-magnetic field detecting values are reduced or increased considerably depending upon the azimuth with values deviated from the peaks and therefore, right at a location of 360 degree or right at a location exceeding 360 degree when desired, the correction finish predicting signal W is outputted.

What is claimed is:

1. A correcting mechanism for an electronic azimuth meter, the correcting mechanism comprising:
   an X-direction magnetic sensor and a Y-direction magnetic sensor for detecting intensities of a magnetic field in two orthogonal directions X and Y and for calculating an azimuth of a main body of an electronic azimuth meter in accordance with magnetic field intensity values from the X- and the Y-direction magnetic sensors;
   storing means for storing a maximum value and a minimum value of the magnetic field detected by each of the X-direction and the Y-direction magnetic sensors;
   updating means for updating the maximum value or the minimum value of the magnetic field when the value of the magnetic field detected by each of the X-direction and the Y-direction magnetic sensors is larger than the maximum value stored in the storing means or smaller than the minimum value stored in the storing means;
   azimuth changing means for providing a display of an induction mark to induce a continuous change of the azimuth of the electronic azimuth meter main body over a range of rotation larger than 360 degrees;
   predicting means for predicting that the maximum value or the minimum value of the magnetic field in the X- or Y-direction is a true value when each of the maximum values and the minimum values of the magnetic field values in the X-direction and the Y-direction is not updated during a predetermined time period in accordance with rotation of the electronic azimuth meter main body and in accordance with a display of the induction mark by the azimuth changing means, and for canceling a prediction indicating the true value when the maximum value or the minimum value predicted to be the true value is updated by the updating means; and
   stop control means for controlling the updating means to stop updating when all of the maximum values and the minimum values in the X-direction and the Y-direction are predicted to be the true values and when the change of the azimuth of the electronic azimuth main body reaches 360 degree or more.

2. A correcting mechanism according to claim 1; wherein the stop control means includes means for stopping the display of the induction mark when the updating means stops updating.

3. An electronic azimuth meter having the correcting mechanism according to claim 2.

4. An electronic timepiece having the electronic azimuth meter according to claim 3.

5. An electronic azimuth meter having the correcting mechanism according to claim 1.

6. An electronic timepiece having the electronic azimuth meter according to claim 5.

7. A correcting mechanism for an electronic azimuth meter, the correcting mechanism comprising:

an X-direction magnetic sensor and a Y-direction magnetic sensor for detecting a magnetic field in two orthogonal directions X and Y and for calculating an azimuth of a main body of an electronic azimuth meter; and azimuth changing means for providing a display of an induction mark to induce a continuous change of the azimuth of the electronic azimuth meter main body over a range of rotation larger than 360 degrees.

8. A correcting mechanism according to claim 7, further comprising updating means for updating a maximum value or a minimum value of the magnetic field detected by the X-direction and the Y-direction sensors to a newly detected magnetic field value when the newly detected magnetic field value is larger than the maximum value or smaller than the minimum value of the magnetic field; predicting means for predicting that the maximum value or the minimum value of the magnetic field in the X- or Y-direction is a true value when the maximum value or the minimum value of the magnetic field in each of the X-direction and the Y-direction is not updated during a predetermined time period in accordance with rotation of the electronic azimuth meter main body and in accordance with a display of the induction mark by the azimuth changing means, and for canceling a prediction indicating the true value when the maximum value or the minimum value predicted to be the true value is updated; and stop control means for controlling the updating means to stop updating when all of the maximum values and the minimum values in the X-direction and the Y-direction are predicted to be the true values and when the azimuth change is displayed over a range of 360 degrees or more.

9. A correcting mechanism according to claim 8; wherein the stop control means includes means for stopping the display of the induction mark when the updating means stops updating.

10. An electronic azimuth meter having the correcting mechanism according to claim 9.

11. An electronic timepiece having the electronic azimuth meter according to claim 10.

12. An electronic azimuth meter having the correcting mechanism according to claim 8.

13. An electronic timepiece having the electronic azimuth meter according to claim 12.

14. An electronic azimuth meter having the correcting mechanism according to claim 7.

15. An electronic timepiece having the electronic azimuth meter according to claim 14.

16. A correcting mechanism for an electronic azimuth meter, the correcting mechanism comprising:

detecting means for detecting intensities of a magnetic field in two orthogonal directions;

calculating means for calculating an azimuth of a main body of an electronic azimuth meter in accordance with a value of the magnetic field detected by the detecting means;

updating means for updating a maximum value or a minimum value of the magnetic field to a newly detected magnetic field value when the newly detected magnetic field value is larger than a given maximum value or smaller than a given minimum value;

azimuth changing means for providing a rotational display of an induction mark to induce a continuous change of the azimuth of the electronic azimuth meter main body over a range of rotation of at least 360 degrees;

determining means for determining whether the electronic azimuth meter main body has been rotated by at least 360 degrees in accordance with the rotational display of the induction mark; and stop control means for controlling the updating means to stop updating the maximum or minimum value of the magnetic field when the determining means determines that the electronic azimuth meter main body has been rotated by at least 360 degrees.

17. An electronic azimuth meter having the correcting mechanism according to claim 16.

18. An electronic timepiece having the electronic azimuth meter according to claim 17.

* * * * *